(12) United States Patent
Artherholt (10) Patent No.: US 7,845,619 B2
(45) Date of Patent: *Dec. 7, 2010

(54) TWO-PART BACK CAP FOR A PLUG VALVE AND PLUG VALVES INCORPORATING SAME

(75) Inventor: Danny Lee Artherholt, Asher, OK (US)

(73) Assignee: Stinger Wellhead Protection, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,788

(22) Filed: Mar. 18, 2010

(65) Prior Publication Data

US 2010/0171060 A1 Jul. 8, 2010

Related U.S. Application Data

(63) Continuation of application No. 12/556,978, filed on Sep. 10, 2009, now Pat. No. 7,699,291, which is a continuation of application No. 12/347,445, filed on Dec. 31, 2008, now Pat. No. 7,597,307, which is a continuation of application No. 11/430,605, filed on May 9, 2006, now Pat. No. 7,481,418.

(51) Int. Cl.
*F16K 5/04* (2006.01)

(52) U.S. Cl. ...................... 251/309; 251/900

(58) Field of Classification Search ............. 251/309, 251/310, 311, 312, 900, 366, 367
See application file for complete search history.

(56) References Cited

U.S. PATENT DOCUMENTS

| | | |
|---|---|---|
| 1,299,428 A | 4/1919 | Cheeks |
| 1,451,588 A | 4/1923 | Reidt |
| 1,921,846 A | 8/1933 | Sparks |
| 2,269,887 A | 1/1942 | Sharp |
| 2,488,932 A | 11/1949 | Penick |
| 2,495,596 A | 1/1950 | Mueller |
| 2,591,031 A | 4/1952 | Volpin et al. |
| 2,647,720 A | 8/1953 | Volpin |
| 2,685,299 A | 8/1954 | Stolberg |
| 2,954,961 A | 10/1960 | Stogner et al. |
| 2,999,510 A | 9/1961 | Volpin |
| 3,066,908 A | 12/1962 | Floren et al. |
| 3,133,722 A | 5/1964 | McGuire et al. |
| 3,279,492 A | 10/1966 | Bell et al. |
| 3,346,002 A | 10/1967 | Thompson, Jr. et al. |
| 3,414,002 A | 12/1968 | Volpin |
| 4,332,370 A * | 6/1982 | Williams ............ 251/214 |
| 4,393,893 A | 7/1983 | Alexander |
| 4,450,854 A | 5/1984 | Alexander et al. |

(Continued)

*Primary Examiner*—John Bastianelli
(74) *Attorney, Agent, or Firm*—Nelson Mullins Riley & Scarborough, LLP (57) ABSTRACT

A two-part back cap for a plug valve includes a back cap seal body and a back cap retainer nut. The back cap retainer nut secures the back cap seal body within the plug valve and securely supports the back cap seal body. A gap between an outer periphery of the back cap retainer nut and the back cap seal body permits the back cap seal body to flex and expand with a plug valve body of the plug valve. This ensures that the back cap seals are not stressed and a longer service life results.

20 Claims, 6 Drawing Sheets

U.S. PATENT DOCUMENTS

| | | | |
|---|---|---|---|
| 4,506,696 A | 3/1985 | von Pechmann | |
| 4,796,858 A * | 1/1989 | Kabel | 251/171 |
| 5,050,843 A * | 9/1991 | Brooks | 277/362 |
| 5,205,325 A | 4/1993 | Piper | |
| 5,950,664 A | 9/1999 | Battaglia | |
| 6,655,658 B2 | 12/2003 | Neal et al. | |
| 6,675,825 B1 | 1/2004 | Reeves et al. | |
| 7,204,474 B2 | 4/2007 | McGuire et al. | |
| 7,213,641 B2 | 5/2007 | McGuire et al. | |
| 7,481,239 B2 | 1/2009 | McGuire et al. | |
| 7,481,418 B2 * | 1/2009 | Artherholt | 251/309 |
| 7,597,307 B2 * | 10/2009 | Artherholt | 251/309 |
| 7,699,291 B2 * | 4/2010 | Artherholt | 251/309 |
| 2007/0251578 A1 | 11/2007 | McGuire | |

* cited by examiner

TWO-PART BACK CAP FOR A PLUG VALVE AND PLUG VALVES INCORPORATING SAME

RELATED APPLICATIONS

This application is a continuation of U.S. patent application Ser. No. 12/556,978 filed Sep. 10, 2009, which is a continuation of U.S. patent application Ser. No. 12/347,445 filed Dec. 31, 2008, now U.S. Pat. No. 7,597,307; which is a continuation of U.S. patent application Ser. No. 11/430,605 filed May 9, 2006, now U.S. Pat. No. 7,481,418.

FIELD OF THE INVENTION

This invention generally relates to fluid flow control valves and, in particular, to back caps for high-pressure plug valves.

BACKGROUND OF THE INVENTION

High-pressure plug valves are well known in the art and used principally in the oil and gas industry. A high-pressure plug valve is described in Assignee's co-pending United States Patent Application published under publication number 2006/0027779 on Feb. 9, 2006, which is entitled High-Pressure Plug Valve with Replaceable Inserts and Method of Refurbishing Same.

Figure 1:
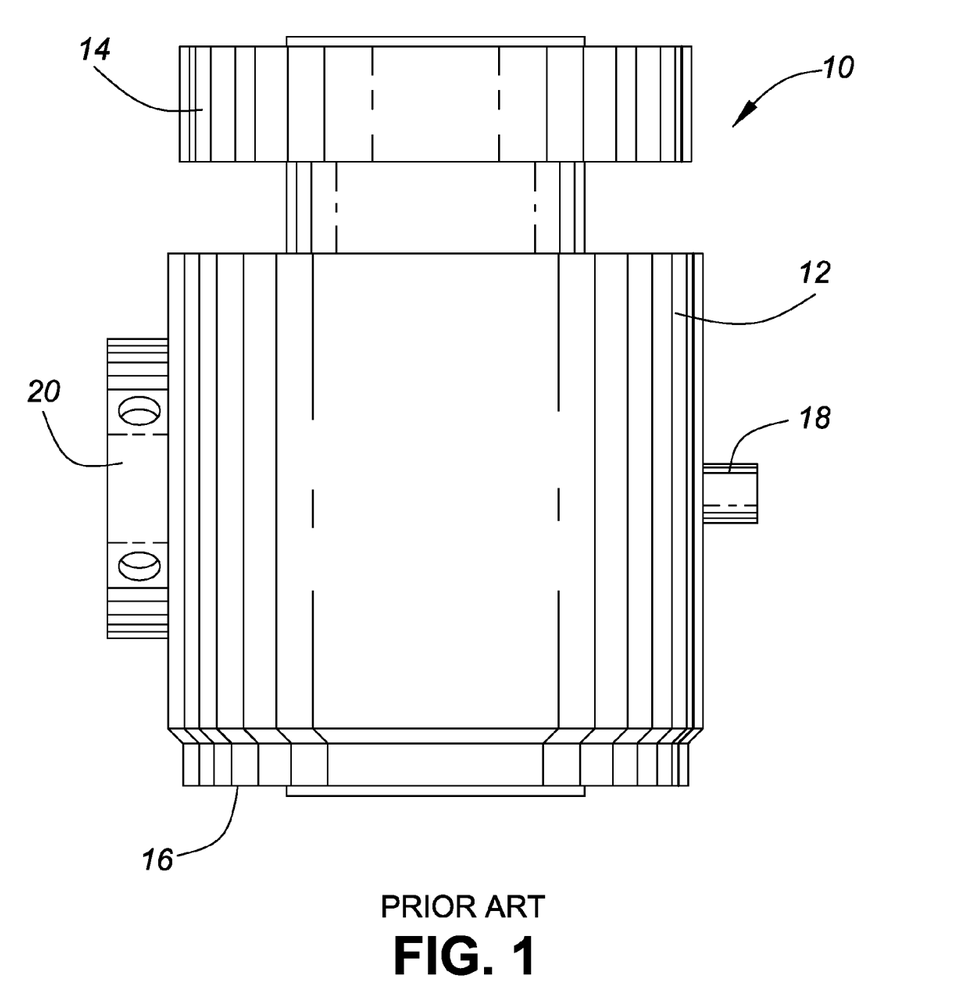
FIG. 1 is a side elevational view of a plug valve in accordance the prior art.

FIG. 1 shows a side elevational view of a plug valve 10 of this type. The plug valve 10 includes a plug valve body 12 having a top flange 14 and a stud pad 16. As will be understood by those skilled in the art, the flange 14 and stud pad 16 could be any of a flange, stud pad or threaded union. The plug valve 10 has a stem 18 for rotating a plug (not shown) within the plug valve body 12 to control fluid flow through the valve in a manner well known in the art. The plug is retained in the plug valve body 12 by a back cap 20.

Figure 2:
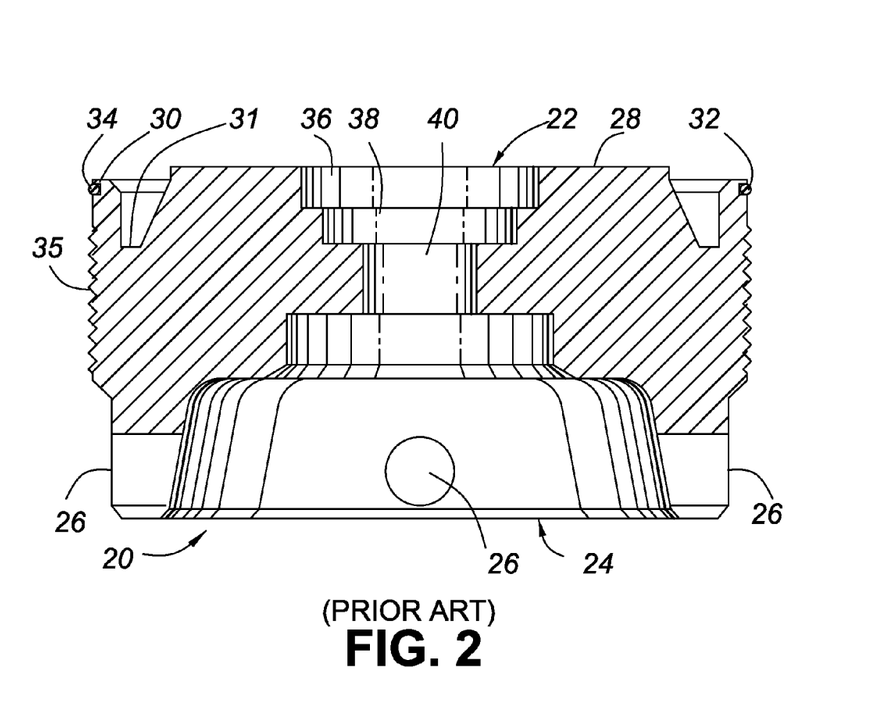
FIG. 2 is a cross sectional view of a back cap for the plug valve shown in FIG. 1.

FIG. 2 is a schematic cross-sectional view of a back cap in accordance with the prior art. The back cap 20 has an inner end 22 and an outer end 24. The outer end 24 includes a plurality of radial bores 26 through which a tool can be inserted to install the back cap 20 in the plug valve body 12 or remove it from the plug valve body 12. The inner end 22 includes a plug support surface 28 which supports the plug of the plug valve 10. The inner end 22 further includes a seal rim 30 having a peripheral O-ring groove 32 that receives an O-ring for providing a seal above pin threads 35 that engage box threads (not shown) in the plug valve body 12 to retain the back cap 20 in the plug valve body 12. The inner end 22 further includes a seal bore 36 which receives a fluid seal for sealing around a stud end of the plug. The stud end of the plug is received in a guide bore 38 that aligns the plug within a plug cage (not shown) of the plug valve body 12. The stud end also extends through a stud bore 40 for fluid pressure balance with the stem 18 shown in FIG. 1.

A problem with the back cap 20 occurs during installation of the back cap 20 in the plug valve body 12. Because the back cap 20 is retained in the plug valve body 12 by the pin threads 35, it must be rotated during installation. When the O-ring 34 encounters a sealing surface against which it seals in an interior of the plug valve body 12, the O-ring 34 resists rotation due to frictional engagement with the sealing surface. Consequently, the O-ring 34 can be damaged, or it may roll partially out of the O-ring groove 32. If this occurs the valve will leak around the back cap, even though the leak may not develop until the valve has seen a certain amount of high-pressure service.

Even if the O-ring 34 stays in the O-ring groove 32 and is not damaged during installation, a leak around the back cap can still develop due to stress on the O-ring 34. As understood by those skilled in the art, when subjected to high fluid pressures the plug valve body 12 expands, or "grows" as it is referred to in the industry. As the plug valve body 12 expands, a gap develops between an outer peripheral surface of the seal rim 30 and the seal surface of the plug valve body 12. Even though an undercut 31 is provided in the back cap 20 to permit the seal rim 30 to expand with the plug valve body 12, experimentation as shown that under very high pressures the seal rim 30 does not expand at the same rate as the plug valve body 12. This creates a space between the seal rim 30 and the plug valve body 12 that puts stress on the O-ring 34. That stress eventually causes the O-ring 34 to fail, which results in a leak around the back cap 20, requiring maintenance of the plug valve 10.

There is therefore a need for a back cap for a plug valve that provides a long service life without maintenance. There is also need for a plug valve with a back cap that can be installed without danger of damaging back cap seals.

SUMMARY OF THE INVENTION

It is therefore an object of the invention to provide a back cap for a high-pressure plug valve that is easily and reliably installed and provides a long service life without maintenance. It is a further object of the invention to provide a plug valve with a back cap that consistently provides a reliable high-pressure seal.

The invention therefore provides a two-part back cap for a plug valve body, comprising: a back cap seal body having an inner end and an outer end, the inner end comprising a plug support surface for supporting a plug in the plug valve body and a seal rim for sealing against the plug valve body, and the outer end comprising an outer surface; and a back cap retainer nut that retains the back cap seal body in the plug valve body and has an inner surface that cooperates with the outer surface of the back cap seal body to permit the back cap seal body to flex under fluid pressure until the outer surface of the back cap seal body is in full metal-to-metal contact with the inner surface of the back cap retainer nut.

The invention further provides a plug valve, comprising: a back cap seal body having an inner end with a plug support surface for supporting a plug received in a plug valve body of the plug valve, a seal rim for providing a fluid seal between the back cap seal body and the plug valve body, and an outer end comprising an outer surface; and a back cap retainer nut with threads that engage the plug valve body to retain the plug and the back cap seal body within the plug valve body, and an inner surface that cooperates with the outer surface of the back cap seal body to permit the back seal body to flex until a fluid pressure within the plug valve is high enough to force the outer surface of the back cap seal body into full metal-to-metal contact with the inner surface of the back cap retainer nut.

The invention yet further provides a two-part back cap for a plug valve body, comprising: a back cap seal body having an inner end with a valve plug support surface, a seal rim that supports at least one fluid seal against an end cap seal surface of the plug valve body, and an outer end with an outer surface; and a back cap retainer nut having a thread that engages a thread of the plug valve body to retain the back cap seal body and the valve plug within the plug valve body, the back cap retainer nut further having an inner end that cooperates with the outer surface of the back cap seal body to permit the back cap seal body to flex under fluid pressure until the outer surface of the back cap seal body is forced by the fluid pressure into complete metal-to-metal contact with the inner end of the back cap retainer nut.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a two-part back cap for a plug valve that provides a reliable long-term seal without maintenance. The two-part back cap includes a back cap seal body that can be inserted into a plug valve body without rotation to ensure that an O-ring seal between the back cap seal body and the plug valve body is not damaged during installation of the back cap seal body. The two-part back cap also includes a hollow retainer nut that securely retains the back cap seal body in position. An outer end of the back cap seal body is contoured to provide a gap between an outer edge of the back cap seal body and an inner end of the back cap retainer nut. That gap permits the back cap seal body to expand under fluid pressure along with the plug valve body, ensuring that the O-ring seal is not stressed when the plug valve is subjected to high fluid pressures. A long service life of the two-part back cap is thereby ensured.

Figure 3:
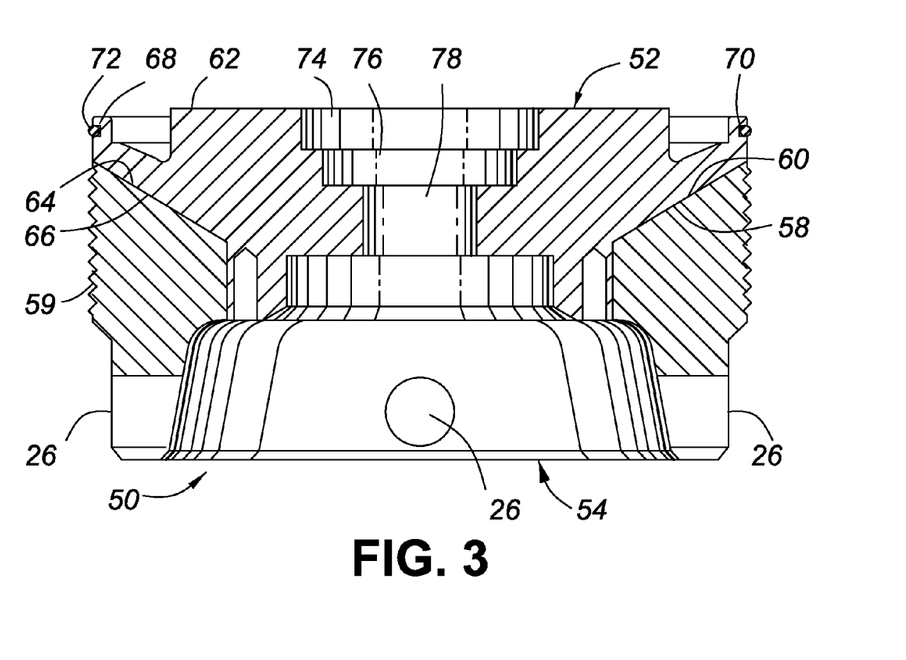
FIG. 3 is a cross-sectional view of a two-part back cap for a plug valve in accordance with the invention.

FIG. 3 is a cross-sectional view of a two-part back cap 50 in accordance with the invention. The two-part back 50 includes a back cap seal body 52 and a back cap retainer nut 54. The back cap retainer nut 54 is a hollow nut that includes an inner end 58 having an inner surface 60. The inner surface 60 is inclined at an angle with respect to an axis of the back cap retainer nut 54, as will be explained in detail below with reference to FIG. 5. The back cap retainer nut also includes a pin thread 59 for engaging box threads of a plug valve body, as will be explained below with reference to FIGS. 5-7.

The back cap seal body 52 includes an outer end 64 with an inclined surface 66. The inclined surface 66 mates with the inner surface 60 of the back cap retainer nut only part of the way along the inclined surface 66, as will also be explained below in detail with reference to FIG. 5. The back cap seal body 52 further includes an inner end having a plug support surface 62. An outer edge of the inner end further includes a seal rim 68. An outer periphery of the seal rim 68 includes an O-ring groove 70, which accepts an O-ring 72 for providing a fluid seal between the back cap seal body 52 and a plug valve body of a plug valve in accordance with the invention. The back cap seal body 52 further includes a seal bore 74, a guide bore 76 and a stud bore 78.

Figure 4:
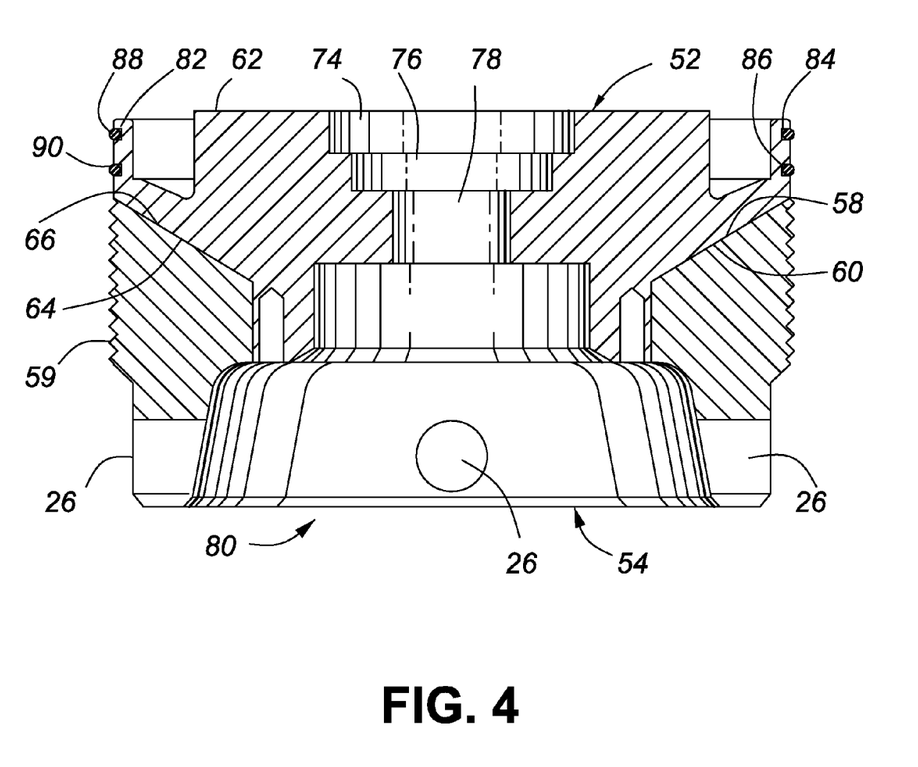
FIG. 4 is a cross-sectional view of another embodiment of the two-part back cap in accordance with the invention.

FIG. 4 is a cross-sectional view of a two-part back cap 80 in accordance with another embodiment of the invention. The two-part back cap 80 is identical to the two-part back cap 50 described above with reference to FIG. 3, except that it includes a seal rim 82 having a first O-ring groove 84 and a second O-ring groove 86. The first O-ring groove 84 accepts an O-ring 88 and the second O-ring groove 86 accepts an O-ring and 90. As noted above, in all other respects the two-part back cap is identical to the two-part back cap 50 and the other components will not be redundantly described.

Figure 5:
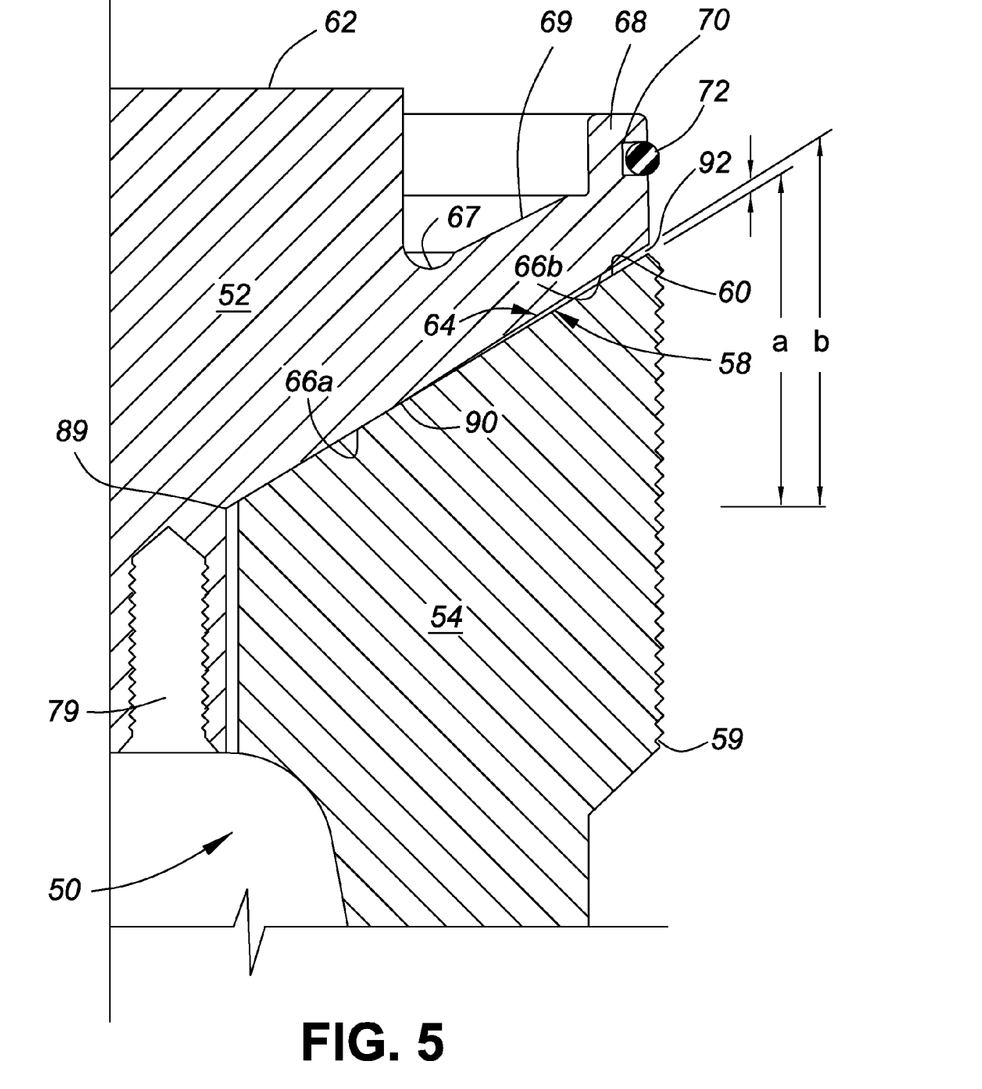
FIG. 5 is a detailed cross-sectional view of one side of the two-part back cap shown in FIG. 3.

FIG. 5 is a detailed cross-sectional view of one side of the two-part back cap shown in FIG. 3. As explained above the with reference to FIG. 3, the back cap retainer nut 54 has an inner end 58 with an inner surface 60 that is inclined toward the seal rim 68 at an angle of inclination "a" with respect to a line perpendicular to a central axis of the back cap retainer nut 54. The angle "a" can be in a range from 20°-40°. In one embodiment of the invention the angle "a" is 30°. The back cap seal body 52 has an outer end 64 with an outer surface 66 that includes a first surface 66a adjacent the stud bore 78 (see FIG. 3). The first surface begins at a point 89 and ends at a point 90. The first surface is inclined toward the seal rim 68 at an angle of inclination equal to the angle "a". The outer end 64 further includes a second surface 66b which is continuous with the first surface 66a. The second surface 66b extends from the point 90 to an outer periphery of the back cap seal body 52. The second surface 66b is inclined toward the seal rim 68 at an angle of inclination "b". The angle "b" may be about 0.5°-1.5° greater than the angle "a". In one embodiment, the angle "b" is about 0.5° greater than the angle "a". In that embodiment, a gap 92 between an outer edge of the back cap seal body 52 and an outer edge of the back cap retainer nut 54 is about 0.014".

As will be explained below with reference to FIG. 7, a difference between the angles "a" and "b" is dependent on a rigidity of the plug valve body 12 into which the two-part back cap 50, 80 is installed. In general, the more flexible the plug valve body 12, the greater should be the difference between the angles "a" and "b". It should be noted that in one embodiment, the point 90 is aligned with an inner edge of a radius 67 formed at a bottom of an undercut 69 between the plug support surface 62 and the seal rim 68.

Figure 6:
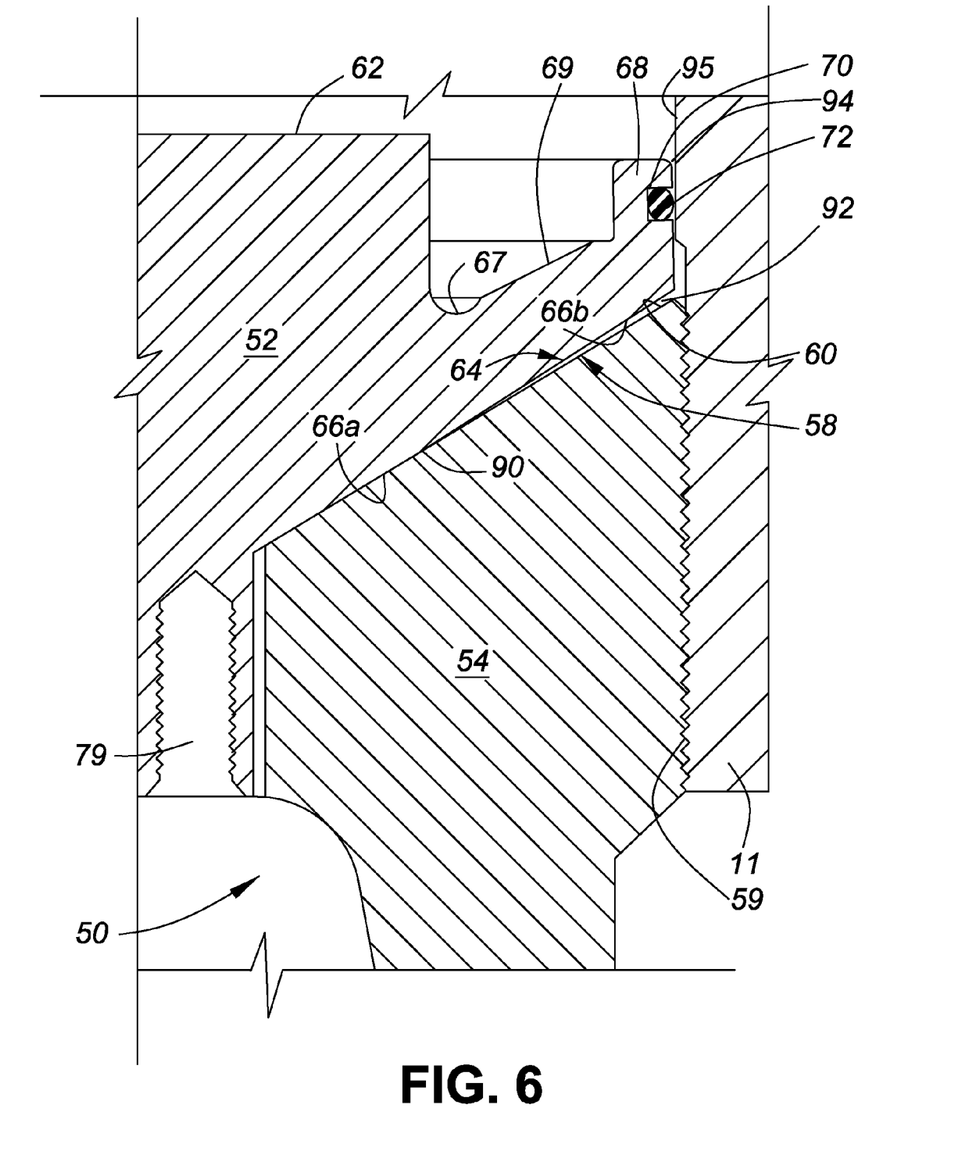
FIG. 6 is a detailed cross-sectional view of the side of the two-part back cap shown in FIG. 5 installed in a plug valve in accordance with the invention.

FIG. 6 is a detailed cross-sectional view of the two-part back cap 50 installed in a plug valve 11 in accordance with the invention. As explained above, the pin thread 59 on the back cap retainer nut 54 engages a box thread in a valve body of the plug valve 11. Only a small part of one side of the plug valve 11 is shown. The plug valve 11 includes a back cap seal surface 95. The O-ring 72 received in the O-ring groove 70 in the seal rim 68 of the back cap seal body 52 seals against the seal surface 95. When the back cap seal body 52 is installed in the plug valve 11, the back cap seal body is inserted into the plug valve 11 without rotation. Consequently, the O-ring 72 is not damaged. Thereafter, the back cap retainer nut 54 is installed and tightened against the back cap seal body 52. When the two-part back cap 50 is installed in the plug valve 11, a gap 94 exists between the seal rim 68 and the seal surface 95. Likewise, the gap 92 exists between outer edges of the inner surface 60 of the back cap retainer nut 54 and the outer surface 64b of the back cap seal body 52.

Figure 7:
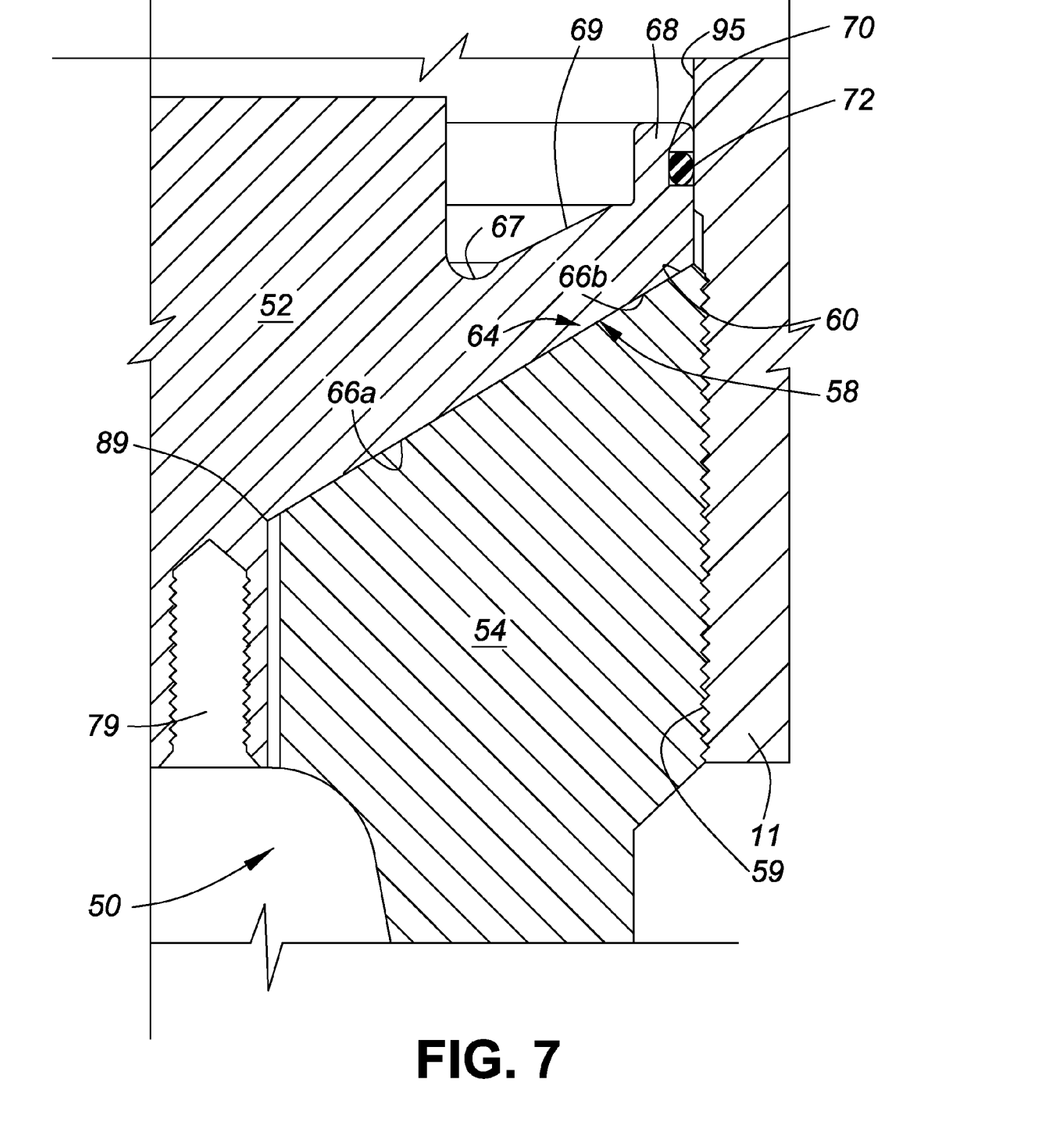
FIG. 7 is a detailed cross-sectional view of the two-part back cap shown in FIG. 6 when the plug valve is subjected to very high fluid pressure.

FIG. 7 is a detailed cross-sectional view of the two-part back cap 50 shown in FIG. 6 when the plug valve 11 is under high fluid pressure. As a can be seen, when the plug valve 11 is under high fluid pressure, the back cap seal body 52

"grows" with the plug valve body of the plug valve 11 because the seal rim 68 flexes outwardly and downwardly with the increased fluid pressure. Consequently, the gap 92 and the gap 94 are eliminated and there is metal-to-metal contact between an outer periphery of the seal rim 68 and the seal surface 95. Likewise, there is metal-to-metal contact between the surfaces 60 and 66b. This ensures that the O-ring 72 is not stressed at extreme fluid pressures. As a result, the two-part back cap 50, 80 in accordance with the invention has a long service life and rarely requires maintenance, even when repeatedly exposed to fluid pressures of up to 20,000 psi. As noted above, the difference between the angles "a" and "b" is dependent on a flexibility of a plug valve body of the plug valve 11. In general, the more flexible the plug valve body, the greater a difference between the two angles should be.

Once installed in the plug valve 11, removal of the back cap retainer nut 54 will not remove the back cap seal body 52. Consequently, a plurality of tapped bores 79 which permit the connection of a puller are provided. Any one of a number of pullers well known in the art may be used to extract the back cap seal body 52 from the plug valve 11.

The invention therefore provides a plug valve 11 that is more reliable during high pressure fluid service. The plug valve 11 in accordance with the invention therefore requires less frequent maintenance.

As will be understood by those skilled in the art, the embodiments of the invention described above are intended to be exemplary only. The scope of the invention is therefore intended to be limited solely by the scope of the appended claims.

I claim:

1. A two-part back cap for a plug valve body, comprising:
   a back cap seal body having an inner end and an outer end, the inner end comprising a plug support surface for supporting a plug in the plug valve body and a seal rim for sealing against the plug valve body, and the outer end comprising an outer surface; and
   a back cap retainer nut that retains the back cap seal body in the plug valve body and has an inner surface that cooperates with the outer surface of the back cap seal body to permit the back cap seal body to flex under fluid pressure until the outer surface of the back cap seal body is in full contact with the inner surface of the back cap retainer nut.

2. The two-part back cap as claimed in claim 1 wherein the outer surface of the back cap seal body comprises a first surface adjacent a stud bore through the back cap seal body and a second surface continuous with the first surface, the first surface being inclined toward the seal rim at a first angle and the second surface being inclined toward the seal rim at a second angle that is greater than the first angle.

3. The two-part back cap as claimed in claim 2 wherein the second angle is 0.5°-1.5° greater than the first angle.

4. The two-part back cap as claimed in claim 3 wherein the first angle is about 30°.

5. The two-part back cap as claimed in claim 4 wherein the second angle is about 30.5°.

6. The two-part back cap as claimed in claim 2 further comprising an undercut and a radius having an inner edge adjacent the plug support surface of the back cap seal body.

7. The two-part back cap as claimed in claim 6 wherein a transition from the first surface to the second surface is axially aligned with the inner edge of the undercut.

8. The two-part back cap as claimed in claim 1 wherein the back cap seal body further comprises a plurality of tapped bores that permit the connection of a puller to the back cap seal body.

9. The two-part back cap as claimed in claim 1 wherein the seal rim comprises an O-ring groove that supports an O-ring that contacts an end cap seal surface of the plug valve body.

10. A plug valve, comprising:
    a back cap seal body having an inner end with a plug support surface for supporting a plug received in a plug valve body of the plug valve, a seal rim for providing a fluid seal between the back cap seal body and the plug valve body, and an outer end comprising an outer surface; and
    a back cap retainer nut with threads that engage the plug valve body to retain the plug and the back cap seal body within the plug valve body, and an inner surface that cooperates with the outer surface of the back cap seal body to permit the back seal body to flex until a fluid pressure within the plug valve is high enough to force the outer surface of the back cap seal body into full contact with the inner surface of the back cap retainer nut.

11. The plug valve as claimed in claim 10 wherein the seal rim is disposed along an outer edge of the inner end of the back cap seal body, and the seal rim supports an O-ring against a seal surface in the plug valve body.

12. The plug valve as claimed in claim 10 wherein the outer surface of the back cap seal body comprises a first surface adjacent a stud bore through the back cap seal body and a second surface continuous with the first surface, the first surface being inclined toward the seal rim at a first angle and the second surface being inclined toward the seal rim at a second angle that is greater than the first angle.

13. The plug valve as claimed in claim 12 wherein the back cap seal body further comprises an undercut and a radius having an inner edge adjacent the plug support surface.

14. A two-part back cap for a plug valve body, comprising:
    a back cap seal body having an inner end with a valve plug support surface, a seal rim that supports at least one fluid seal against an end cap seal surface of the plug valve body, and an outer end with an outer surface; and
    a back cap retainer nut having a thread that engages a thread of the plug valve body to retain the back cap seal body and the valve plug within the plug valve body, the back cap retainer nut further having an inner end that cooperates with the outer surface of the back cap seal body to permit the back cap seal body to flex under fluid pressure until the outer surface of the back cap seal body is forced by the fluid pressure into complete contact with the inner end of the back cap retainer nut.

15. The two-part back cap as claimed in claim 14 wherein the outer surface of the back cap seal body comprises a first surface adjacent a stud bore through the back cap seal body and a second surface continuous with the first surface, the first surface being inclined toward the seal rim at a first angle and the second surface being inclined toward the seal rim at a second angle that is greater than the first angle.

16. The two-part back cap as claimed in claim 15 further comprising an undercut and a radius having an inner edge adjacent the plug support surface, and the second surface is axially aligned with the inner edge of the undercut.

17. The two-part back cap as claimed in claim 15 wherein the back cap seal body further comprises a guide bore that is concentric with the stud bore.

18. The two-part back cap as claimed in claim 14 wherein the fluid seal comprises an O-ring received in a O-ring groove in the seal rim.

19. The two-part back cap as clamed in claim 15 wherein the first angle is about 30°.

20. The two-part back cap as claimed in claim 19 wherein the second angle is about 30.5°.

* * * * *

UNITED STATES PATENT AND TRADEMARK OFFICE
CERTIFICATE OF CORRECTION

| | | |
|---|---|---|
| PATENT NO. | : 7,845,619 B2 | Page 1 of 1 |
| APPLICATION NO. | : 12/726788 | |
| DATED | : December 7, 2010 | |
| INVENTOR(S) | : Danny Lee Artherholt | |

It is certified that error appears in the above-identified patent and that said Letters Patent is hereby corrected as shown below:

Column 1, line 36, add the number --20-- after the word "cap".
Column 1, line 45, add the number --34-- after the word "O-ring".
Column 4, line 12, add the number --80-- before the word "is".

Signed and Sealed this
Fourteenth Day of August, 2012

David J. Kappos
*Director of the United States Patent and Trademark Office*